UNITED STATES PATENT OFFICE.

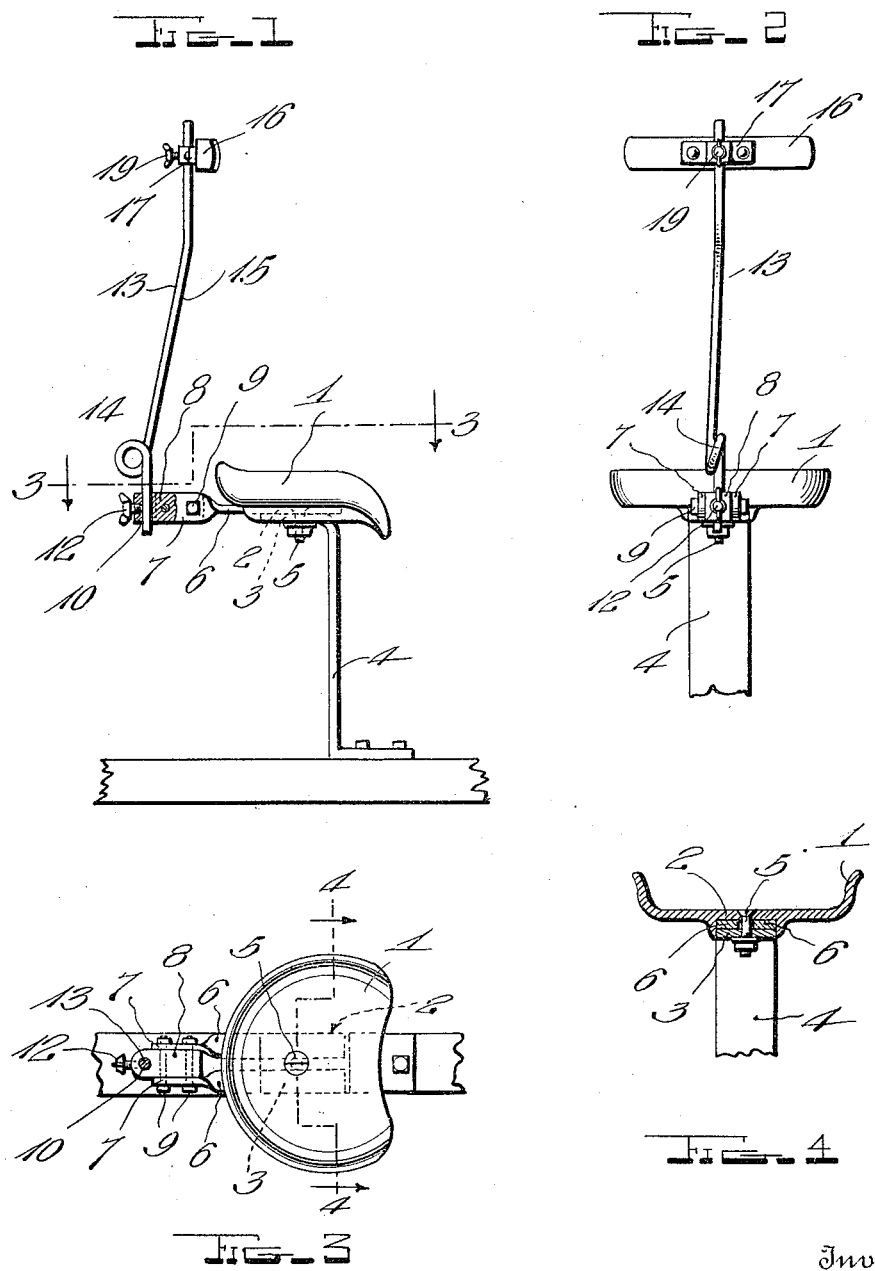

JACOB GABRIELSE, OF SHEBOYGAN, WISCONSIN.

DETACHABLE SPRING-BACK FOR VEHICLE-SEATS.

1,231,148.   Specification of Letters Patent.   Patented June 26, 1917.

Application filed January 22, 1917. Serial No. 143,705.

*To all whom it may concern:*

Be it known that I, JACOB GABRIELSE, a citizen of the United States, residing at Sheboygan, in the county of Sheboygan and State of Wisconsin, have invented certain new and useful Improvements in Detachable Spring-Backs for Vehicle-Seats; and I do declare the following to be a full, clear, and exact description of the invention, such as will enable others skilled in the art to which it appertains to make and use the same.

This invention relates to new and useful improvements in spring backs, and more particularly a spring back that is adapted to be detachably connected with a vehicle seat, the back being especially adapted for application to a seat of riding cultivators, plows and like farming implements, but the back may be applied to various other kinds of seats where it is desirable to ease the back of the rider and to relieve him from the annoyance and possible injury of excessive vibration.

The object of this invention is to provide a device of this character which is simple and durable in construction, inexpensive to manufacture, and one which will be very efficient in operation.

With this and numerous other objects in view, the invention consists of the novel features of construction, the combination and arrangement of parts which will be herein referred to and more particularly pointed out in the specification and claim.

In the accompanying drawings:

Figure 1 is a side elevation of the back applied to a cultivator seat;

Fig. 2 is a rear elevation of the same;

Fig. 3 is a horizontal section on the line 3—3 of Fig. 1; and,

Fig. 4 is a transverse section on the line 4—4 of Fig. 3.

In describing this invention I shall refer to the drawings in which similar reference characters designate corresponding parts throughout the several views. I have shown my detachable spring back applied to the conventional type of cultivator seat in the accompanying drawing but this back may be applied to various kinds of seats that employ the general members set forth in the seat connection shown.

The cultivator seat 1 is provided with a longitudinally extending recess 2 in its bottom surface, and in which is adapted to be positioned the horizontally extending portion 3 of the seat post 4. This portion of the seat post is held into engagement with the seat, to support the same by means of a vertically extending clamping bolt 5 that extends through the parts as clearly shown in Fig. 4 of the drawing. My new and improved spring back is connected with the seat and support by means of a pair of horizontally extending flat strips 6, which are adapted to be interposed between the support 3 and the seat 1 within the recess 2. These strips are positioned on opposite sides of the clamping bolt 5 and when the parts are clamped in operative position, it will be obvious that the strips will be securely held in position. By this clamping connection it will be obvious that the strips 6 are capable of assuming various horizontally adjusted positions with respect to the seat.

The rear ends 7 of the strips 6 project rearwardly from the back of the seat 1 and have their end portions given each a quarter turn and disposed in substantially parallel spaced relation with each other and at right angles to the portions of the strips that are clamped to the seat. Positioned between the rear ends of the strips 6 is a block 8 that is securely held in engagement between these ends by means of a pair of transversely extending bolts 9 that extend through the block and adjacent the sides of the strips. This block 8 is also provided with a vertically extending opening 10 therethrough adjacent its rear end. An adjusting set screw 12 is carried by the block and the same is adapted to have its inner end project laterally into the opening 10 to securely clamp therein the portion of the back that projects therethrough.

The detachable back comprises a spring rod 13 having its lower end positioned through the vertical opening 10 in the block and adapted to be vertically adjusted therein by means of the clamping screw 12. The spring rod 13 has a coil 14 formed therein adjacent its lower end and above the coil the rod extends forwardly as shown at 15, with its upper extremity bent vertically and adapted to have positioned thereon a back rest 16. This back rest 16 has secured to its rear side a casting 17 with a vertical opening therethrough in which the upper end of the spring rod is positioned and the back rest is capable of various vertical adjustment with respect to the rod by means of a clamping screw 19 that is carried by the casting and which projects through the same and is adapted to engage the portion of the spring rod therein.

In operation, when it is desired to secure this back to the conventionel type of cultivator or plow seat shown in the accompanying drawing, the clamping bolt 5 is removed and the seat 1 lifted. Then the forward portions of the horizontally extending strips which have the block 8 secured between their rear ends is positioned on the support 3 and the seat and bolt once more placed in position. Upon the bolt 5 being tightened, the forward portions of the strips will be securely clamped between the seat and support within the recess 2. It is obvious that upon loosening the bolt 5, the strips are capable of horizontal adjustment with respect to the seat.

The back comprises a spring rod which has its lower end positioned through the vertical opening in the block 8 and capable of assuming various vertically adjusted positions therein as has been hereinbefore described and this spring rod extends forwardly and has at its upper end a vertically adjustable back rest. The rod also is provided with a coil intermediate its ends to give the required amount of spring to the back.

This type of back seat is easily attached to various types of seats where it is desired to ease the back from the annoyance and possible injury due to excessive vibration. This type of back is especially adapted for use on cultivator seats, and seats of various other types of farming implements. The back is adjustable vertically and horizontally with respect to the seat to which it is secured, so that it may be adapted to various sizes of users.

From the foregoing description of the construction and operation of my new and improved detachable spring back for vehicle seats, the manner of applying the same to use and the operation thereof will be readily understood, and it will be seen that I have provided a simple and efficient means for carrying out the objects of the invention.

I claim:—

The combination with a seat having a horizontally extending support beneath the same, a clamping bolt connecting said seat and support, of a pair of spaced parallel strips interposed between said seat and support and adapted to be held in various longitudinally adjusted positions therebetween, the rear ends of said strips each having a quarter turn, a block disposed between said ends of the strips and having a vertical opening therethrough, fastening means to secure said block in position, a spring rod slidably mounted in the opening and in the block, releasable fastening means carried by said block and adapted to engage the block to hold the same in various adjusted positions, and a back rest vertically adjustable on said spring rod.

In testimony whereof I have hereunto set my hand in the presence of two subscribing witnesses.

JACOB GABRIELSE.

Witnesses:
Joe. Bielis,
Danker Van Der Werle.

Copies of this patent may be obtained for five cents each, by addressing the "Commissioner of Patents, Washington, D. C."